Jan. 30, 1968
K. A. TRICKETT ETAL
3,366,549
GAS-COOLED NUCLEAR REACTOR
Filed June 30, 1966
2 Sheets-Sheet 1
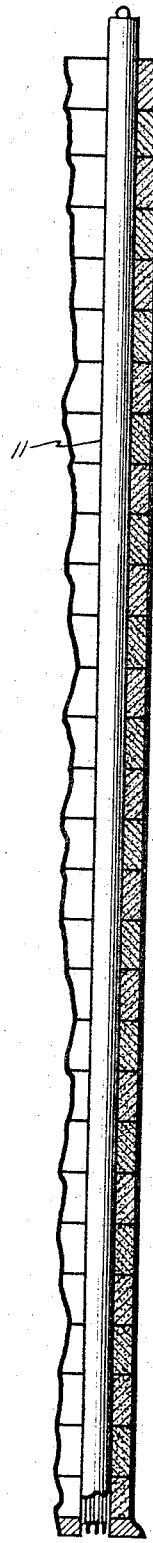
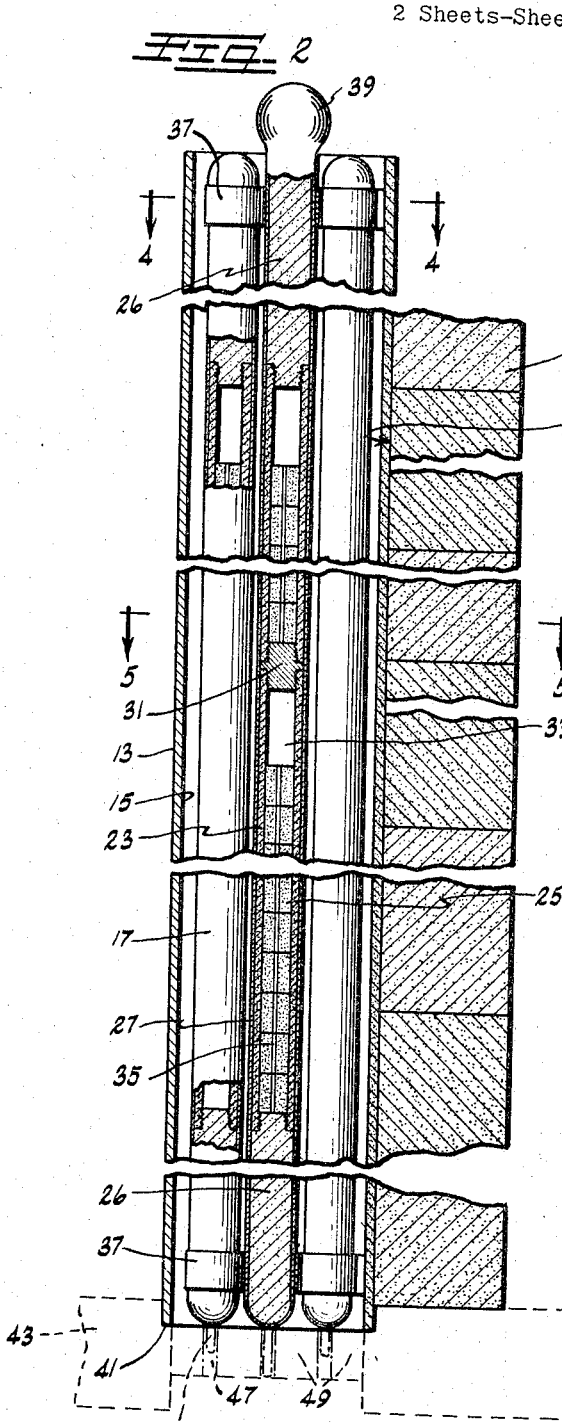
INVENTORS
KENNETH A. TRICKETT
MASSOUD T. SIMNAD
GEORGE J. MALEK
Roland G. Anderson
ATTORNEY Jan. 30, 1968 K. A. TRICKETT ET AL 3,366,549
GAS-COOLED NUCLEAR REACTOR
Filed June 30, 1966 2 Sheets-Sheet 2
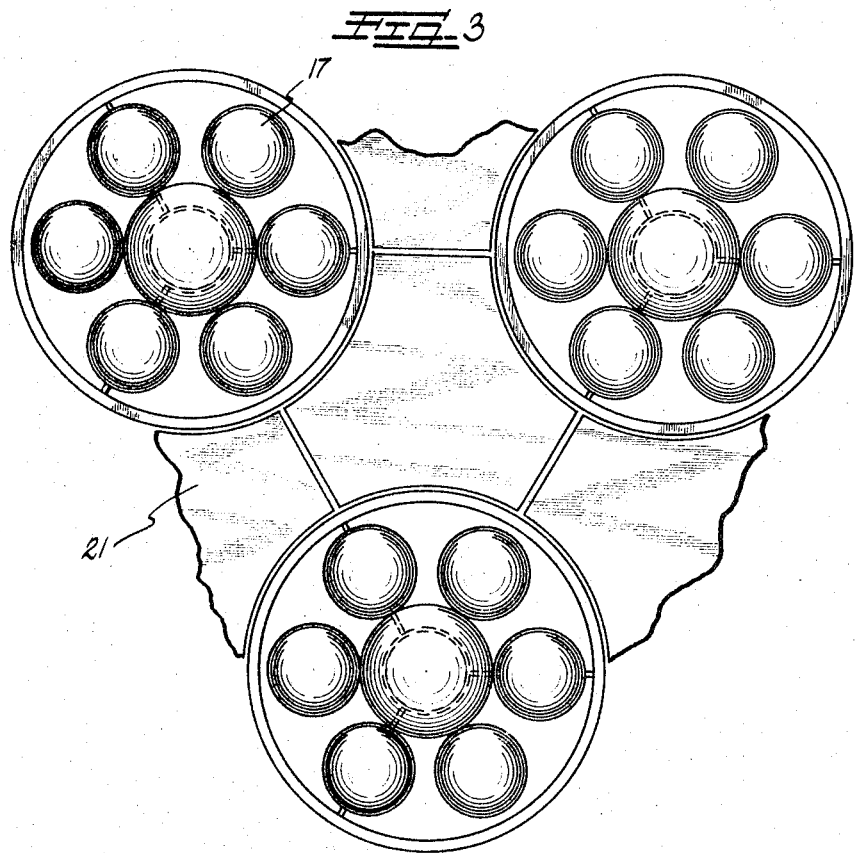
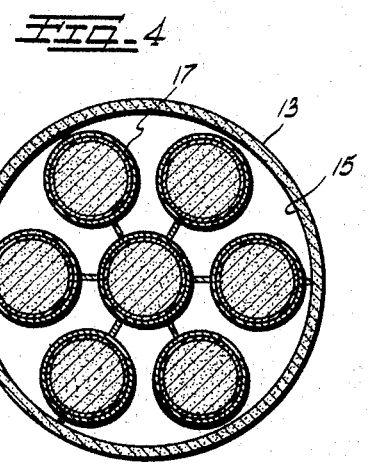
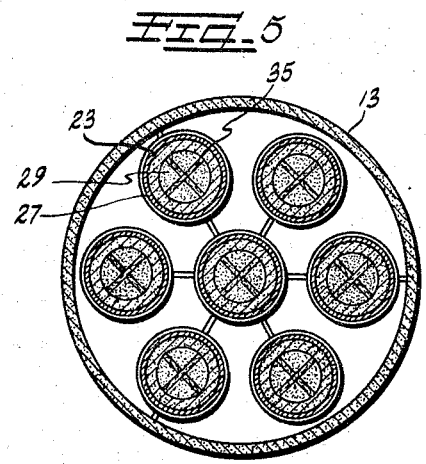
INVENTORS
KENNETH A. TRICKETT
MASSOUD T. SIMNAD
GEORGE J. MALEK
Roland A. Anderson
ATTORNEY

United States Patent Office 3,366,549
Patented Jan. 30, 1968

3,366,549
GAS-COOLED NUCLEAR REACTOR
Kenneth A. Trickett, Rockville, Md., and Massoud T. Simnad, San Diego, and George J. Malek, Poway, Calif., assignors to the United States of America as represented by the United States Atomic Energy Commission
Filed June 30, 1966, Ser. No. 562,949
4 Claims. (Cl. 176—58)

ABSTRACT OF THE DISCLOSURE

A high temperature, gas-cooled nuclear reactor having a refractory tubular sleeve defining a coolant passage, blocks of beryllium moderator material surrounding the sleeve, nuclear-fuel-containing pins within said sleeve, and fission product barrier means surrounding each pin.

---

This invention relates to fuel elements for use in nuclear reactors and more particularly to an improved fuel element for use in a high temperature gas-cooled beryllium-moderated nuclear reactor.

In a gas-cooled nuclear reactor it is desirable to regulate the flow of fluid coolant over individual fuel containing channels so that the outlet coolant temperature from each fuel channel in the reactor core is equal to the outlet temperature from the maximum powered channel. Also, it is desirable to obtain a maximum amount of heat transfer surface per unit volume of fuel material. This inherently results in reduced heat flux on the surface of the fuel material and permits a more flexible, and therefore less costly, selection of materials for use in supporting and containing the fuel material and fission products. Another important aspect of fuel element design is the ability to selectively replace particular components without replacing other components. Often times, for example, when the nuclear fuel material has been expended, the moderator materials must unnecessarily also be replaced because of the interrelationship of nuclear fuel and moderator.

It is a principal object of the present invention to provide an improved fuel element for use in nuclear reactors. It is another object of the invention to provide a fuel element for use in a nuclear reactor wherein the coolant fluid flow rate may be regulated to effect maximum thermal utilization thereof. Still another object of the invention is to provide a fuel element which utilizes nuclear fuel material to give increased heat transfer surface per unit volume of fuel material. A further object is the provision of a fuel element which is inexpensive to construct and to install in a reactor.

These and other objects of the invention are more particularly set forth in the following detailed description and in the accompanying drawings of which:

FIGURE 1 is an overall elevational view, partly broken away, of an assembled fuel element disposed in the core of a nuclear reactor embodying various of the features of the invention;

FIGURE 2 is an enlarged elevational view, partially broken away and partially in section, of the fuel element shown in FIGURE 1;

FIGURE 3 is a fragmentary plan view, with the top support plate removed, of the nuclear reactor core shown in FIGURE 1 showing a plurality of the fuel elements;

FIGURE 4 is a sectional view taken along line 4—4 of FIGURE 2; and

FIGURE 5 is a sectional view taken along line 5—5 of FIGURE 2.

Generally, a fuel element 11 is shown in FIGURE 2 which includes an elongated tubular outer sleeve 13 made of refractory material and having a central bore 15 extending longitudinally therein which defines a passageway for the flow of coolant gas. Disposed longitudinally within the outer sleeve is a cluster of nuclear fuel-containing pins 17. The fuel element 11 is shown in a nuclear reactor core disposed longitudinally in a channel provided in neutron moderator material 21. The assembly is so arranged that the fuel element 11 may be removed or replaced without disturbing the other components.

Referring now specifically to the drawings, the fuel element 11, best seen in FIGURES 1 and 2, is adapted for utilization in a high temperature gas-cooled beryllium-moderated nuclear reactor. The external elongated sleeve 13 defines a passageway through which gas coolant passes longitudinally over the clusters of fuel pins 17. The sleeve 13 primarily serves to locate the fuel pin cluster in the channel provided in the unfueled moderator in the reactor core. Because the sleeve 13 does not serve as a primary heat transfer surface, it may be constructed of any suitable material that is structurally sound and dimensionally stable at the intended operating temperatures, such as $SiO_2$ or alumina. The sleeve 13 may be formed by any suitable forming process, such as extrusion.

Blocks 21 of unfueled beryllium moderator material of suitable shape defines the channels 22 wherein the fuel elements 11 are located. The preferred moderator is high density sintered BeO but other forms of beryllium, such as beryllium carbide for example may be used. The moderator material may be formed by any suitable process into suitably shaped blocks 21 which are stacked one upon another to construct the reactor core moderator structure. The cross sectional configuration of the moderator blocks 21 determines the geometric arrangement of the fuel elements 11 in the reactor. A triangular pitch is shown in FIGURE 3. The size and/or the shape of the blocks 21 may be varied to change the ratio of unfueled moderator material to nuclear fuel. Separation of the moderator material from the fuel core permits the unfueled beryllia moderator material to be left in the core even though the fuel elements 11 are replaced.

Because there is no requirement for good heat transfer between the sleeve 13 and the blocks 21 of moderator material, a close tolerance fit is not necessary, and consequently, as-fired blocks of beryllia may be used (as-fired for the purpose of this application means in the condition obtained from a sintering process without further machining operations).

In this connection the sleeve 13 may be disposed permanently within the channels provided by the blocks 21 of moderator material. In this embodiment the blocks 21 of moderator material do not maintain the structural integrity of the channels 22. Consequently, chipping or cracking of the blocks 21 of moderator material during operation of the reactor is of little consequence. Alternatively, if structural integrity of the blocks 21 of moderator material is maintained, the sleeve 13 may be coupled with the nuclear fuel-containing pins to comprise a fuel element assembly and may, thus, be removed during refueling operations.

Each of the longitudinally oriented nuclear fuel-containing pins 17 of the cluster includes an outer tubular shell 23 formed of refractory material. Compacts of nuclear fuel material 25 are disposed in a longitudinal zone within the shell, and plugs of neutron reflector material 26 are provided at each end.

The tubular shell 23 provides the principal heat transfer surface between the coolant gas and the nuclear fuel. However, the structural stress load on the shell is low, and the shell may have a relatively thin wall so there will be low thermal loss from heat transfer through the wall. The pin cluster concept provides more heat transfer surface area per unit volume of fuel than would a single fuel container and results in reduced surface heat flux. The lower surface heat flux, combined with the thin wall, permit a more flexible choice of refractory materials for use as shell materials. Preferred materials include, but are not limited to, SiC, $SiO_2$, niobium alloys and graphite. If niobium alloys or graphite are used as shell material, their exterior surfaces may be coated with a suitable coating material 27 to prevent oxidation and/or loss of fission products.

The shell 23 serves as a fission product barrier to contain fission products there within and prevent them from reaching the coolant stream. In this connection, graphite coated with SiC is particularly preferred.

As best seen in FIGURE 5, the nuclear fuel compacts may comprise segments 29 of discrete fuel particles, as for example, oxides of uranium, plutonium, or thorium, or combinations thereof, distributed in a suitable matrix material. Partially sintered fuel particles may be used in forming green segments to permit the fuel and the matrix material to contract simultaneously during a subsequent sintering process. Fuel particles produced by a sol-gel process are considered particularly desirable because of their ability to be sintered at 1100° C., rather than the usual higher temperature of 1700° C. This lower sintering temperature permits the fuel particles to shrink fully, several hundred degrees before the matrix material has been completley sintered. Thus, a gap forms betwen the fuel particles and the matrix, preventing the microcracks in the matrix.

The volume fraction of nuclear fuel dispersed in the matrix may be adjusted to vary the ratio of fueled to unfueled moderator material.

Any suitable matrix material may be used for the fuel segments 29 which satisfies the basic requirements of fission product retention, thermal conductivity, and minimum interaction between fuel particles and matrix material. The preferred matrix material is BeO.

The fuel segments 29 may be formed by any suitable process. Since the illustrated fuel segments 29 are uniform in cross-section throughout their length, a preferred forming method is extrusion.

In the assembled fuel element, the fuel segments 29 are disposed in a central longitudinal zone within the tubular shell 23. The end plugs 26 of individual shells are made of a suitable neutron reflector material, preferably graphite coated with SiC.

As shown in FIGURE 2, the fuel pins 17 may comprise a plurality of short threaded tubes joined by connectors 31. The connectors are made of suitable impermeable refractory material so as to prevent passage therethrough of fission products produced in fuel segments 29. The fuel segments 29 are proportioned to provide a space 33 for longitudinal expansion under operating temperatures.

Provision is made for transverse expansion of the fuel segments 29 by disposing an accomodating layer 35 of resilient or crushable material between individual segments 29 (see FIGURE 5). Suitable resilient or crushable materials include, but are not limited to, graphite felt, crushable carbon, charcoal powder, and fibers of beryllia, zirconia, and composites of alumina. The preferred material is graphite felt.

In the embodiment illustrated in FIGURES 2 and 5, the resilient layer 35 accommodates irradiation-induced growth and thermal expansion of the segments 29 and causes the segments 29 to be held closely adjacent to the internal surface of the shell 23. The resilient layer 35 also permits volume variation to compensate for tolerance in the manufacturing of the various components and permits use of as-fired fuel segments without further machining.

The thickness of the resilient layer 35 is a design detail dependent upon the properties of the lining material, the properties of the various components, and the temperature, time, and flux dependence of volume changes in the components. It is believed that the layer 35 should be at least about 50 mils thick to function in the intended manner although the maximum thickness may be left to the designer to afford additional flexibility which can aid in optimizing the system to provide efficient performance.

Assembled fuel pins 17 are disposed longitudinally within the elongated sleeve in a cluster arrangement. To maintain the relative spacing of the individual pins within the sleeve 13, separate spacing spiders 37 of suitable material may be provided as shown in FIGURE 2. Alternatively, enlarged annular collars (not shown) are provided around the external perimeter of the shell. The collars would be spaced at predetermined locations along the length of the pins 17 to provide adequate lateral spacing under reactor operating conditions. The collars could be integral with the shell body.

The assembled fuel element 11 is then disposed in the channels defined by the blocks 21 of unfueled beryllium moderated material. The elongated sleeve 13 rests in a niche 41 set into the bottom support plate 43. Each of the fuel pins 17 are provided with protrusions 45 which engage with openings 47 to aid in spacing the fuel pins 17 and supporting the fuel element 11. The bottom support plate 43 is provided with suitable channels 49 for routing helium coolant from a manifold (not shown) through the fuel channels defined by the elongated sleeve 13 and the fuel pins 17.

One suitable fuel element 11 is illustrated in FIGURE 3 where six fuel pins 17 are located in an hexagonal array with a seventh fuel pin located at the center of the hexagon. Other spacing arrangements may be used to vary the ratio of fueled to unfueled moderator material and to vary the overall surface heat flux.

The elongated sleeve 13 may include orificing means to regulate the flow of coolant gas therethrough to appropriately adjust the coolant flow to suit the power production in the cluster of fuel pins. In this manner, the outlet gas temperature from each fuel channel in the core can be regulated to approximate the outlet gas temperature from the maximum powered channel and thus effect more efficient utilization of the nuclear fuel.

The following example further illustrates one method of making a fuel element embodying various of the features of the invention, but is intended to in no way limit the scope of the invention, which is defined in the appended claims.

*Example*

A generally cylindrical fuel element of a type suitable for use in a high-temperature gas-cooled beryllia moderated nuclear reactor, is made having a 3.65 inch diameter coolant passage as measured by the inner diameter of an external sleeve 13 which defines the coolant passageway.

The external sleeve is made from $SiO_2$ using an extrusion process. The sleeve has an inner diameter of 3.65 inches and an 1/8 inch wall; it is about 15 feet long.

Thin-walled graphite shells 23, coated with silicon carbide are made by vapor depositing silicon carbide on a graphite mandrel. A deposition temperature of 1250° C. is used to build up a silicon carbide coating 27 of about 1/32 inch on a rotating graphite mandrel. The coated graphite mandrel is then cut into appropriate lengths to provide coated shells 23. Each coated shell 23 has an inside diameter of 0.65 inch and is 77 inches long. Both ends of each shell 23 are provided with threads on the interior surface.

Top and bottom reflector end plugs 27 and connectors 31 are prepared from solid graphite stock coated with SiC. The connectors are 7/8 inch in length with threads located at each end as shown in FIGURE 2. The top and bottom reflector end plugs have external threads which engage the internal threads of the shells 23 as shown in FIGURE 2.

Blocks 21 of beryllium oxide moderator are prepared using a conventional extrusion technique. The cross sectional shape (see FIG. 3) of the blocks generally fills the tricusp between three adjacent fuel elements which are located on triangular centers. Sufficient tolerance, about .025 inch is provided to permit beryllia blocks 21 to be used in the as-fired form. After extrusion into lengths of 6 inches, the blocks are heated to 800° C. in an oxidizing atmosphere to remove any volatile matter or oxidize any organic matter that remains after extrusion. The blocks 21 are then sintered in hydrogen at 1500–1700° C. to provide beryllia moderator blocks with densities of about 2.8–2.9 gm. per cc.

Fuel segments 29 are prepared by a cold dry press processing method. Sol-gel particles of a $ThO_2$:$UO_2$ fuel mixture in the ratio of about 4:1 parts by weight, and having an average particle size of 250 microns are uniformly coated with a BeO slurry while the particles are being tumbled. A coating of sufficient thickness is applied so that the fuel particles comprise 30 percent by volume of the sintered matrix. The coated particles are pressed at a pressure of 20,000 p.s.i. into the shape of a quadrant of a cylindrical disc. After forming, the green fueled segments 29 are first heated at a relatively low (660° C.– 900° C.) temperature in an oxidizing atmosphere to remove any volatile or organic material used in the forming process. The fuel segments 29 are then sintered in a hydrogen atmosphere furnace at a temperature of 1700° C.

Fuel pins 17 are assembled by first threading the bottom reflector end plug 26 with one of the tubular sections of the shell 23. Fuel segments 29 are inserted to a depth of about 6 feet, after which a connector 31 is threaded into the opposite end. Another tubular section of shell 23 is threaded to the connector 31, filled to the desired amount with fuel segments 29, and the top plug 27 is threaded into place to provide a fuel pin 17 that is about 15 feet in length.

Seven fuel pins 17 are then assembled in a hexagonal array with one pin at the center of the hexagon using a 1/32 inch thick SiC spider 37. The center fuel pin is provided with a spherical head 39 to cooperate with grappling means (not shown) to load and remove the fuel pin array. The fuel pins array is then placed inside the bore of the $SiO_2$ sleeve 13 in the reactor core.

The reactor core is provided with inlet and exhaust manifolds for appropriately routing helium coolant through the fuel channels defined by the elongated sleeve 13.

The fuel pins can be removed from the sleeve 13 without disturbing the beryllia moderator blocks 21. These fuel elements are considered to have good fission product retention and moderator material utilization and are considered to be advantageously suited for use in a high-temperature gas-cooled baryllium moderated nuclear reactor.

Various of the features of the invention are set forth in the following claims.

What is claimed is:

1. A high temperature, gas-cooled nuclear reactor which comprises an elongated tubular sleeve formed of refractory material which sleeve defines a coolant passage, blocks of beryllium moderator material disposed in generally surrounding relationship to said sleeve, a plurality of separate nuclear fuel-containing pins supported longitudinally within said sleeve and with said nuclear fuel-containing pins each comprising an outer tubular shell formed of refractory material and fuel compacts disposed within said shells, said fuel compacts comprising particles of nuclear fuel dispersed in a matrix of beryllia.

2. The nuclear reactor of claim 1 wherein the nuclear fuel is selected from the oxides of uranium, plutonium, thorium or combinations thereof.

3. The nuclear reactor of claim 1 wherein said tubular shells are graphite coated with silicon carbide.

4. The nuclear reactor of claim 1 wherein said tubular shells are niobium.

References Cited

UNITED STATES PATENTS

| | | | |
|---|---|---|---|
| 3,079,316 | 2/1963 | Johnson | 176—91 X |
| 3,141,829 | 7/1964 | Fortescue et al. | 176—71 X |
| 3,151,036 | 9/1964 | Boyd | 176—58 |
| 3,172,820 | 3/1965 | Lenngren et al. | 176—58 |
| 3,202,585 | 8/1965 | Kling et al. | 176—67 X |
| 3,224,944 | 12/1965 | Turner et al. | 176—58 X |
| 3,238,109 | 3/1966 | Kent et al. | 176—76 X |
| 3,281,328 | 10/1966 | Hazel et al. | 176—76 X |
| 3,284,315 | 11/1966 | Thome | 176—76 |
| 3,291,696 | 12/1966 | Sugimoto et al. | 176—58 X |

FOREIGN PATENTS

| | | |
|---|---|---|
| 841,545 | 11/1957 | Great Britain. |
| 942,591 | 11/1963 | Great Britain. |

REUBEN EPSTEIN, *Primary Examiner.*